United States Patent
Park

(10) Patent No.: US 12,245,913 B2
(45) Date of Patent: Mar. 11, 2025

(54) COMPOSITION FOR FORMING TRANSPARENT ORTHODONTIC DEVICE, METHOD OF PREPARING TRANSPARENT ORTHODONTIC DEVICE, AND TRANSPARENT ORTHODONTIC DEVICE PREPARED BY USING THE METHOD

(71) Applicant: ODS CO., LTD., Incheon (KR)

(72) Inventor: Sung Won Park, Incheon (KR)

(73) Assignee: ODS CO., LTD., Incheon (KR)

( * ) Notice: Subject to any disclaimer, the term of this patent is extended or adjusted under 35 U.S.C. 154(b) by 842 days.

(21) Appl. No.: 17/441,595

(22) PCT Filed: Aug. 26, 2021

(86) PCT No.: PCT/KR2021/011443
§ 371 (c)(1),
(2) Date: Sep. 21, 2021

(87) PCT Pub. No.: WO2022/045796
PCT Pub. Date: Mar. 3, 2022

(65) Prior Publication Data
US 2022/0304776 A1    Sep. 29, 2022

(30) Foreign Application Priority Data

Aug. 26, 2020    (KR) .................. 10-2020-0107965

(51) Int. Cl.
| | |
|---|---|
| C08F 2/46 | (2006.01) |
| A61C 7/08 | (2006.01) |
| B33Y 10/00 | (2015.01) |
| B33Y 70/00 | (2020.01) |
| C08F 2/48 | (2006.01) |
| C08F 2/50 | (2006.01) |
| C08F 220/30 | (2006.01) |
| C08F 220/34 | (2006.01) |

(52) U.S. Cl.
CPC ............. *A61C 7/08* (2013.01); *B33Y 10/00* (2014.12); *B33Y 70/00* (2014.12); *C08F 2/48* (2013.01); *C08F 2/50* (2013.01); *C08F 220/306* (2020.02); *C08F 220/34* (2013.01)

(58) Field of Classification Search
CPC ............ C08F 222/1025; C08F 222/103; C08F 2/50; C08F 2/48; C08F 220/306; B33Y 70/00; B33Y 10/00; B33Y 80/00; A61C 7/08

USPC .................................................. 522/1; 520/1
See application file for complete search history.

(56) References Cited

U.S. PATENT DOCUMENTS

| | | | |
|---|---|---|---|
| 2006/0205838 A1* | 9/2006 | Velamakanni | A61K 6/90 106/35 |
| 2018/0258290 A1 | 9/2018 | Lin et al. | |
| 2019/0175455 A1* | 6/2019 | Sakamaki | A61K 6/00 |

FOREIGN PATENT DOCUMENTS

| | | | |
|---|---|---|---|
| KR | 10-2007-0110430 A | 11/2007 | |
| KR | 10-2019-0044315 A | 4/2019 | |
| WO | 2018/025943 A1 | 2/2018 | |
| WO | WO-2019133999 A1 * | 7/2019 | .......... G03F 7/0037 |

OTHER PUBLICATIONS

Notification of Transmittal of the International Search Report (Forms PCT/ISA/220 and PCT/ISA/210) issued Dec. 10, 2021, by the International Application Division Korean Intellectual Property Office in corresponding International Application No. PCT/KR2021/011443. (5 pages).

Office Action issued Dec. 20, 2021, by the Korean Intellectual Property Office in corresponding Korean Patent Application No. 10-2020-0107965. (6 pages).

* cited by examiner

Primary Examiner — Jessica Whiteley
(74) Attorney, Agent, or Firm — Panitch Schwarze Belisario & Nadel LLP

(57) ABSTRACT

Provided are a composition for forming a transparent orthodontic device, a method of preparing a transparent orthodontic device, and a transparent orthodontic device prepared by using the method. The composition includes 100 parts by weight of a first photocurable compound represented by Formula 1, 35 parts by weight to 75 parts by weight of a second photocurable compound represented by Formula 2, 15 parts by weight to 65 parts by weight of a third photocurable compound represented by Formula 3, 5 parts by weight to 40 parts by weight of a fourth photocurable compound represented by Formula 4, and 1 part by weight to 15 parts by weight of a fifth photocurable compound represented by Formula 5.

20 Claims, 1 Drawing Sheet

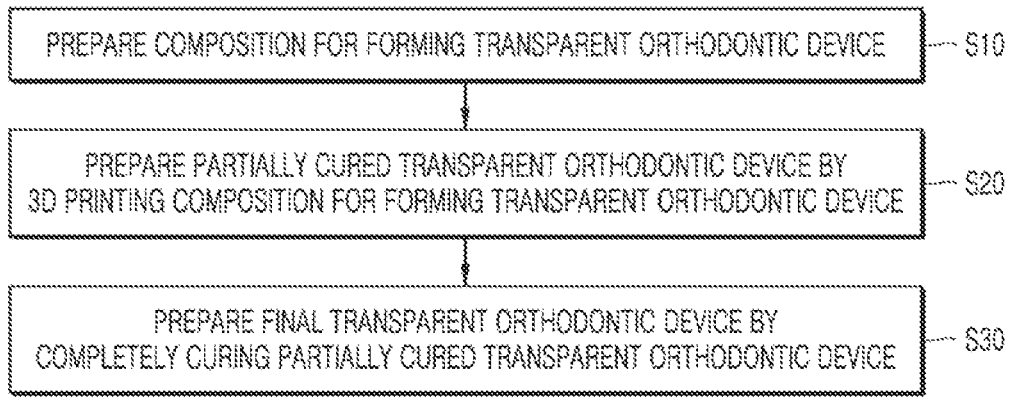

COMPOSITION FOR FORMING TRANSPARENT ORTHODONTIC DEVICE, METHOD OF PREPARING TRANSPARENT ORTHODONTIC DEVICE, AND TRANSPARENT ORTHODONTIC DEVICE PREPARED BY USING THE METHOD

TECHNICAL FIELD

Provided are a composition for forming a transparent orthodontic device, a method of preparing a transparent orthodontic device, and a transparent orthodontic device prepared by using the method. More specifically, provided are a composition for forming a transparent orthodontic device, which can provide a transparent orthodontic device which has excellent strength and which does not easily break, a method of preparing the transparent orthodontic device, and a transparent orthodontic device prepared by using the method.

BACKGROUND ART

Transparent orthodontic devices refer to a device that achieves target tooth movement by thermocompression forming a thermoplastic and plate-shaped transparent polymer composite resin (hereinafter, referred to as resin).

Orthodontic devices of the related art have the features of being attached to and protruding from teeth and having conspicuous structures of metal wires. However, transparent orthodontic devices do not have such features and also, are almost transparent. Accordingly, compared to orthodontic devices of the related art, the transparent orthodontic devices are excellent in the aesthetical aspect. Many people want to receive orthodontic treatments, but cannot choose orthodontic treatments because they are concerned that attaching the orthodontic device to the teeth will adversely affect their work life, interpersonal relationships, and self-confidence. The transparent orthodontic devices can provide comfortable orthodontic treatment without this burden.

Furthermore, the transparent orthodontic devices are thin and thus comfortable to wear and can be removed from the mouth for a short time for meals or brushing, thereby remarkably reducing the inconvenience of daily life. Malocclusion occurs very frequently in population. Accordingly, public interest and demand for orthodontics using the transparent orthodontic devices are inevitably high, and thus the market size related to the transparent orthodontic devices is continuously expanding.

A transparent orthodontic device, i.e., a thermocompression formed resin, is commonly referred to as an aligner, and in this case, the planned tooth movement is continuously achieved by implementing the tooth movement in the resin step by step within the elastic limit of the resin and making the patient to wear the same within his or her mouth. In order to obtain such an effect, the movement of teeth should be reproduced step by step on a model (mold) of the set of teeth used for thermocompression forming of the aligner.

There are two methods used to reproduce stepwise movement of teeth in a mold.

A first method is a manual method. A plaster cast of the set of teeth of a patient is collected, each of the teeth is separated from the collected plaster cast by using a single saw, proper movement of the separated teeth is made in consideration of the movement direction of the teeth and the elastic limit of the resin, and the resultant teeth are fixed again to the collected plaster cast by using an adhesive or wax. Thermal compression molding is performed using the resulting plaster cast as a mold. When the aligner thus obtained is mounted in the mouth of the patient, the position shift information about the next step of the teeth realized in the aligner is transferred to the teeth by the elastic restoring force of the resin, and thus tooth movement occurs.

The aligner should be worn until the movement of the teeth realized thereby actually appears on the teeth (generally, 16 to 21 hours per day, 7 to 14 days or more). Thereafter, in order to obtain an aligner for the next tooth movement, the mouth appearance of the patient is obtained again and dental plaster is poured thereon to obtain the hardened plaster cast of the patient's set of teeth, and then, these processes are repeatedly performed to obtain a target tooth arrangement.

A second method is a scheme based on three-dimensional (3D) scanning and 3D printing technology. A 3D image of the set of teeth of the patient is obtained by a scanner, and by using the obtained image, a step-by-step teeth movement is simulated by using a computer program in consideration of a target tooth movement direction and elasticity of the resin. The movement of the individual teeth is implemented in stages from the initial position to the final position. Then, a mold for thermocompression forming of the resin is output by a 3D printer one by one for each step. A thermocompression forming is performed on the outputted mold to obtain an aligner of each step for tooth movement.

Unlike a manual method, this method has no need to take the appearance by repeatedly calling patients, and it is possible to confirm whether or not tooth movement has been reasonably set in advance and make an adjustment by identifying step-by-step simulations of teeth movements implemented on a computer screen based on a three-dimensional image of the set of teeth. Therefore, with respect to the final treatment result and the treatment process, the communication may be made between a patient and a doctor, or between a company which provides a service and the doctor. Accordingly, an error which may occur may be prevented in advance. A representative service of this method is Invisalign (Align Technology).

As described above, the transparent orthodontic device is very attractive to those who want orthodontic treatment compared to the general wire orthodontic device due to excellent aesthetics and convenience of use. However, transparent orthodontic devices of the related art are not satisfactory in terms of flexural strength, flexural modulus of elasticity, and elongation at break.

DESCRIPTION OF EMBODIMENTS

Technical Problem

An embodiment of the present disclosure provides a composition for forming a transparent orthodontic device, which can provide a transparent orthodontic device which has excellent strength and which is not easily broken.

An embodiment of the present disclosure provides a method of preparing a transparent orthodontic device, the method including preparing the composition for forming a transparent orthodontic device.

An embodiment of the present disclosure provides a transparent orthodontic device prepared by the method of preparing the transparent orthodontic device.

Solution to Problem

An aspect of the present disclosure provides a composition for forming a transparent orthodontic device, the composition including:

100 parts by weight of a first photocurable compound represented by Formula 1;
35 parts by weight to 75 parts by weight of a second photocurable compound represented by Formula 2;
15 parts by weight to 65 parts by weight of a third photocurable compound represented by Formula 3;
5 parts by weight to 40 parts by weight of a fourth photocurable compound represented by Formula 4; and
1 part by weight to 15 parts by weight of a fifth photocurable compound represented by Formula 5:

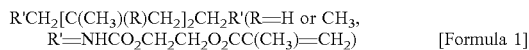

R'CH$_2$[C(CH$_3$)(R)CH$_2$]$_2$CH$_2$R'(R=H or CH$_3$, R'=NHCO$_2$CH$_2$CH$_2$O$_2$CC(CH$_3$)=CH$_2$)  [Formula 1]

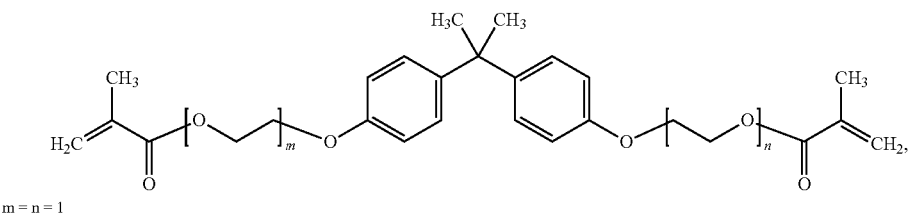

[Formula 2]

m = n = 1

CH$_2$=C(CH$_3$)COOCH$_2$CH$_2$OH  [Formula 3]

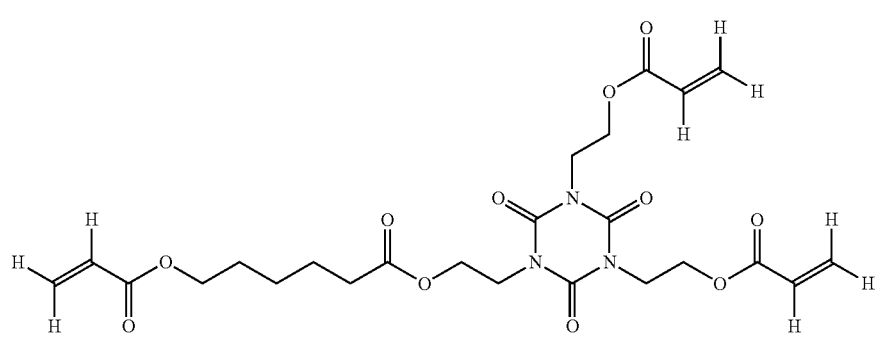

[Formula 4]

CH$_2$=C(CH$_3$)COO(CH$_2$CH$_2$O)$_3$COC(CH$_3$)=CH$_2$.  [Formula 5]

The composition for forming a transparent orthodontic device may further include 0.5 parts by weight to 5 parts by weight of an acrylic resin based on 100 parts by weight of the total weight of the first photocurable compound, the second photocurable compound, the third photocurable compound, the fourth photocurable compound, and the fifth photocurable compound.

The composition for forming a transparent orthodontic device may further include 1 part by weight to 20 parts by weight of a photoinitiator based on 100 parts by weight of the total weight of the first photocurable compound, the second photocurable compound, the third photocurable compound, the fourth photocurable compound, and the fifth photocurable compound.

The composition for forming a transparent orthodontic device may further include 0.1 parts by weight to 2 parts by weight of an antioxidant based on 100 parts by weight of the total weight of the first photocurable compound, the second photocurable compound, the third photocurable compound, the fourth photocurable compound, and the fifth photocurable compound.

The composition for forming a transparent orthodontic device may not include a pigment.

The composition for forming a transparent orthodontic device may not include a solvent.

The composition for forming a transparent orthodontic device may have a viscosity of 300 centipoise (cps) to 800 cps.

The composition for forming a transparent dental correction device may be liquid, photocurable, and used for 3D printing.

Another aspect of the present disclosure provides a method of preparing a transparent orthodontic device, the method including:

preparing the composition for forming a transparent orthodontic device (S10);

preparing a partially cured transparent orthodontic device by 3D-printing the composition for forming a transparent orthodontic device (S20); and preparing a final transparent orthodontic device by fully curing the partially cured transparent orthodontic device (S30).

Another aspect of the present disclosure provides a method of preparing a transparent orthodontic device, the method including:

a transparent orthodontic device prepared by the method of preparing the transparent orthodontic device.

Advantageous Effects of Disclosure

A composition for forming a transparent orthodontic device according to an embodiment of the present disclosure has excellent strength, is not easily broken, and is mostly made of resin, and thus the transparent orthodontic device has a soft surface, thereby preventing damage to normal teeth.

BRIEF DESCRIPTION OF DRAWING

FIG. 1 shows a flowchart illustrating a method of preparing a transparent orthodontic device according to an embodiment of the present disclosure.

MODE OF DISCLOSURE

Hereinafter, a composition for forming a transparent orthodontic device according to an embodiment of the present disclosure will be described in detail.

A composition for forming a transparent orthodontic device according to an embodiment of the present disclosure includes 100 parts by weight of a first photocurable compound represented by Formula 1, 35 parts by weight to 75 parts by weight of a second photocurable compound represented by Formula 2, 15 parts by weight to 65 parts by weight of a third photocurable compound represented by Formula 3, 5 parts by weight to 40 parts by weight of a fourth photocurable compound represented by Formula 4, and 1 part by weight to 15 parts by weight of a fifth photocurable compound represented by Formula 5:

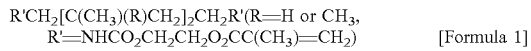   [Formula 1]

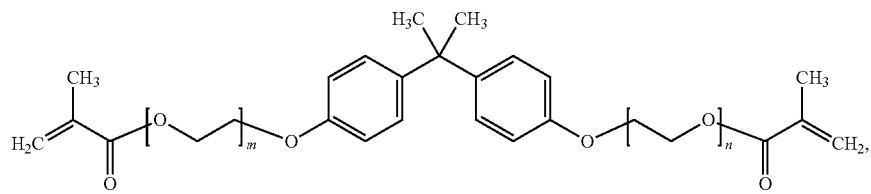

$m = n = 1$

[Formula 2]

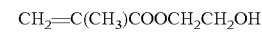   [Formula 3]

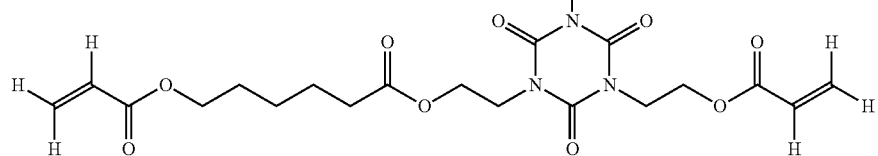

[Formula 4]

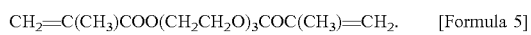   [Formula 5]

The first photocurable compound may be a mixture in which an isomer in which R is H and an isomer in which R is $CH_3$, are mixed in a certain ratio. For example, the first photocurable compound may have a molecular formula of $C_{23}H_{38}N_2O_8$ and a molecular weight of 470.56.

When the amount of each of the first photocurable compound, the second photocurable compound, the third photocurable compound, and the fourth photocurable compound is within the corresponding range, a transparent orthodontic device which has excellent flexural strength, a long elongation at break, and a suitable level of flexural modulus of elasticity and thus is not easily broken, and which is mostly made of a resin and thus does not damage a normal tooth due to a soft surface, may be prepared.

Each of the photo-curable compounds may be ultraviolet (UV) curable.

In an embodiment, the composition for forming a transparent orthodontic device may further include 0.5 parts by weight to 5 parts by weight of an acrylic resin based on 100 parts by weight of the total weight of the first photocurable compound, the second photocurable compound, the third photocurable compound, the fourth photocurable compound, and the fifth photocurable compound. When the amount of the acrylic resin is within the above range, the overall properties (i.e., properties other than flexural strength, elongation at break, and flexural modulus of elasticity) of the transparent orthodontic device may be improved.

The acrylic resin may include Dianal BR-83 (manufactured by Mitsubishi Rayon, a glass transition temperature of 105° C., a weight average molecular weight of 40,000), Dianal BR-87 (manufactured by Mitsubishi Rayon, a glass transition temperature of 105° C., a weight average molecular weight of 25,000), Dianal BR-60 (manufactured by Mitsubishi Rayon, a glass transition temperature of 75° C., a weight average molecular weight of 70,000), Dianal BR-77 (manufactured by Mitsubishi Rayon, a glass transition temperature of 80° C., a weight average molecular weight of 65,000), or a combination thereof.

In an embodiment, the composition for forming a transparent orthodontic device may further include 1 part by weight to 20 parts by weight of a photoinitiator based on 100 parts by weight of the total weight of the first photocurable compound, the second photocurable compound, the third photocurable compound, the fourth photocurable compound, and the fifth photocurable compound. When the amount of the photoinitiator is within the range, a curing time of the composition for forming a transparent orthodontic device may be appropriate and the storage stability thereof may be improved, and the cured product (i.e. the final transparent orthodontic device) may have a wrinkle-free and smooth surface.

The photoinitiator may include acetophenone, benzyl, benzoin, benzophenone, 2-benzoylbenzoic acid, 4,4'-bis(diethylamino)benzophenone, 4,4'-bis(dimethylamino)benzophenone, benzoin methyl ether, benzoin isopropyl ether, benzoin isobutyl ether, benzoin ethyl ether, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxol-5-yl)-4,6-bis(trichloromethyl)-1,3,5-triazine, 2-benzyl-2-(dimethylamino)-4'-morpholinobutyrophenone, (±)-camphorquinone, 2-chlorothioxanthone, 4,4'-dichlorobenzophenone, 2,2-diethoxyacetophenone, 2,2-dimethoxy-2-phenylacetophenone, 2,4-diethylthioxanthene-9-one,diphenyl (2,4,6-trimethylbenzoyl)phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone 2-isopropylthioxanthone, lithium phenyl (2,4,6-trimethylbenzoyl)phosphinate, 2-methyl-4'-(methylthio)-2-morpholinopropiophenone, 2-isonitrosopropiophenone, 2-phenyl-2-(p-toluenesulfonyloxy)acetophenone, phenylbis (2,4,6-trimethylbenzoyl)phosphine oxide, or a combination thereof.

In an embodiment, the composition for forming a transparent orthodontic device may further include 0.1 parts by weight to 2 parts by weight of an antioxidant based on 100 parts by weight of the total weight of the first photocurable compound, the second photocurable compound, the third photocurable compound, the fourth photocurable compound, and the fifth photocurable compound. When the amount of the antioxidant is within the above range, sufficient antioxidant effects may be obtained and may not adversely affect other properties of the transparent orthodontic device.

The antioxidant may include: a hindered phenol-based compound such as 2,6-di-tert-butyl-para-cresol, or 4,4'-methylenebis(6-tert-butyl-ortho-cresol); an aromatic amine-based compound such as dioctyldiphenylamine or phenyl-alpha-naphthalene; a sulfur compound; a phosphorus compound; a dialkyldithiophosphate (e.g., sulfurized fat, dicetyl sulfide, dibenzyldisulfide, or alkyldithiophosphates), which is a complex of sulfur and phosphorous; disalicylidine diaminopropane; didodecylthio benzimidazole; or a combination thereof.

In an embodiment, the composition for forming a transparent orthodontic device may not include a pigment.

The composition for forming a transparent orthodontic device may have a viscosity of 300 cps to 800 cps. The term "viscosity" used herein refers to a viscosity measured at room temperature (25° C.) using DV-quat heometer RPM (shear rate: 25/s) prepared by Brookfield Corporation.

The composition for forming a transparent orthodontic device may not include a solvent. However, the present disclosure is not limited thereto, and the composition for forming the transparent orthodontic device may further include a solvent.

The solvent may include ethanol, methanol, isopropanol, butanol, water, methylene glycol, ethylene glycol, propylene glycol, butylene glycol, neopentyl glycol, hexylene glycol, acetone, methyl ethyl ketone, ethyl acetate, butyl acetate, cyclohexanone, cyclohexane, methylene chloride, chloroform, carbon tetrachloride, trichloroethylene, perchloroethylene, methyl glycol acetate, toluene, benzene, diethyl ether, benzyl alcohol, glycerin, or a combination thereof.

The composition for forming a transparent orthodontic device may further include an additive such as a stabilizer and a plasticizer.

The stabilizer may include benzophenone, oxanilide, benzotriazole, halogenated benzotriazole, triazine, or a combination thereof.

The plasticizer may include glycerin, propylene glycol, polyethylene glycol, ethylene glycol, sorbitol, mannitol, or a combination thereof.

The composition for forming a transparent orthodontic device may be a liquid (or suspension), photocurable, and used for 3D printing.

Hereinafter, a method of preparing a transparent orthodontic device according to an embodiment of the present disclosure will be described in detail.

FIG. 1 shows a flowchart illustrating a method of preparing a transparent orthodontic device according to an embodiment of the present disclosure.

Referring to FIG. 1, a method of preparing a transparent orthodontic device according to an embodiment of the present disclosure may include preparing a composition for forming a transparent orthodontic device (S10), preparing a partially cured transparent orthodontic device by 3D printing the composition for forming a transparent orthodontic device (S20), and preparing a final transparent orthodontic device by fully curing the partially cured transparent orthodontic device (S30).

In process S10, the mixing ratio of the five types of photocurable compounds, the acrylic resin, the photoinitiator, and the antioxidant may be appropriately controlled within the composition range of the composition for forming a transparent orthodontic device so as to obtain a transparent orthodontic device having the target flexural strength, the target elongation at break, and the target flexural modulus of elasticity.

Process S20 may be performed by a 3D printer, and the shape of the transparent orthodontic device may be formed by partially curing the composition for forming a transparent orthodontic device by continuously or intermittently irradiating ultraviolet rays onto the composition for forming a transparent orthodontic device printed during the 3D printing process. The term "partially curing" used herein refers to a condition where the curing rate is 40% to 90%.

In process S30, the partially cured transparent orthodontic device is completely cured using a separate curing device, thereby preparing a final transparent orthodontic device. The term "completely curing" used herein refers to a condition where the curing rate is 99% to 100%.

Hereinafter, a transparent orthodontic device prepared by the method of preparing the transparent orthodontic device, will be described in detail.

The transparent orthodontic device has outstanding mechanical properties (high flexural strength, high elongation at break, and an appropriate level of flexural modulus of elasticity) and high transparency.

Hereinafter, examples of the present disclosure will be described, but the present disclosure is not limited to the following examples.

Examples 1-1 to 1-9 and Comparative Examples 1-1 to 1-8: Preparation of Composition for Forming Transparent Orthodontic Device Prepared was a composition for forming a transparent orthodontic device including: diurethane dimethacrylate represented by Formula 1 (Cas No. 72869-86-4, the mixture of a material in which R is H and a material having in which R is $CH_3$, and a molecular formula: $C_{23}H_{38}N_2O_8$)(PP1), bisphenol A ethoxylate dimethacrylate represented by Formula 2 (Cas No. 41637-38-1)(PP2), hydroxyethyl methacrylate represented by Formula 3 (Cas No. 868-77-9)(PP3), a urethane acrylate oligomer represented by Formula 4 (Cas No. 106556-00-7)(PP4), and triethylene glycol dimethacrylate represented by Formula 5 (Cas No. 109-16-0)(PP5), which are photocurable compounds; Dianal BR-83 (manufactured by Mitsubishi rayon, a glass transition temperature 105° C., a weight average molecular weight 40,000), which is an acrylic resin; phenylbis(2,4,6-trimethylbenzoyl) phosphine oxide (Cas No. 162881-26-7), which is a photoinitiator; and 2,6-di-tertiary-butyl-para-cresol, which is an antioxidant. The materials and amounts used in respective Example and Comparative Example are shown in Table 1. In Table 1, a unit of each value is parts by weight. In addition, the amount of each of the acrylic resin, the photoinitiator, and the antioxidant is based on 100 parts by weight of the total weight of the five kinds of photocurable compounds.

Evaluation Example 1: Evaluation of Mechanical Properties of Transparent Orthodontic Device The flexural strength, flexural modulus of elasticity (flexural modulus), and elongation at break of each of the transparent orthodontic devices prepared according to Examples and Comparative Examples were measured using a tensile strength tester. Results thereof are shown in Table 2. Here, the elongation at break refers to a distance by which a pusher descends until a specimen obtained by cutting long is broken, when the central portion of the specimen is pushed downwards by the pusher in the state where the specimen is placed on and perpendicular to a pair of elongated supports spaced from each other and disposed in parallel to each other (that is, a distance by which the pusher descends from a starting point at which the pusher initially contacts the specimen to a point at which the specimen is broken).

TABLE 1

| | | Examples | | | | | | | | |
|---|---|---|---|---|---|---|---|---|---|---|
| | | 1-1 | 1-2 | 1-3 | 1-4 | 1-5 | 1-6 | 1-7 | 1-8 | 1-9 |
| Photocurable | PP1 | 100 | 100 | 100 | 100 | 100 | 100 | 100 | 100 | 100 |
| compound | PP2 | 55 | 35 | 75 | 55 | 55 | 55 | 55 | 55 | 55 |
| | PP3 | 40 | 40 | 40 | 15 | 65 | 40 | 40 | 40 | 40 |
| | PP4 | 23 | 23 | 23 | 23 | 23 | 5 | 40 | 23 | 23 |
| | PP5 | 7 | 7 | 7 | 7 | 7 | 7 | 7 | 1 | 15 |
| Acrylic resin | | 2.5 | 2.5 | 2.5 | 2.5 | 2.5 | 2.5 | 2.5 | 2.5 | 2.5 |
| Photoinitiator | | 6 | 6 | 6 | 6 | 6 | 6 | 6 | 6 | 6 |
| Antioxidant | | 1 | 1 | 1 | 1 | 1 | 1 | 1 | 1 | 1 |

| | | Comparative Example | | | | | | | |
|---|---|---|---|---|---|---|---|---|---|
| | | 1-1 | 1-2 | 1-3 | 1-4 | 1-5 | 1-6 | 1-7 | 1-8 |
| Photocurable | PP1 | 100 | 100 | 100 | 100 | 100 | 100 | 100 | 100 |
| compound | PP2 | 30 | 80 | 55 | 55 | 55 | 55 | 55 | 55 |
| | PP3 | 40 | 40 | 10 | 70 | 40 | 40 | 40 | 40 |
| | PP4 | 23 | 23 | 23 | 23 | 1 | 45 | 23 | 23 |
| | PP5 | 7 | 7 | 7 | 7 | 7 | 7 | 0.5 | 20 |
| Acrylic resin | | 2.5 | 2.5 | 2.5 | 2.5 | 2.5 | 2.5 | 2.5 | 2.5 |
| Photoinitiator | | 6 | 6 | 6 | 6 | 6 | 6 | 6 | 6 |
| Antioxidant | | 1 | 1 | 1 | 1 | 1 | 1 | 1 | 1 |

Examples 2-1 to 2-7 and Comparative Examples 2-1 to 2-6: Preparation of Transparent Orthodontic Devices Each of the compositions for forming transparent orthodontic devices prepared according to Examples and Comparative Examples, was used for printing with a 3D printer and partially cured to prepare a partially cured transparent orthodontic device. Then, the partially cured transparent orthodontic device was completely cured using a curing device to prepare a final transparent orthodontic device. The 3D printer and the curing device were manufactured as a set, and were prepared by Ray Dent Studio Corporation. For each of the composition for forming a transparent orthodontic device, three transparent orthodontic devices were prepared using the corresponding composition.

Evaluation Example 2: Evaluation of Transparency of Transparent Orthodontic Device The sensory test was performed on each of the transparent orthodontic devices prepared according to Examples and Comparative Examples. Specifically, the five trained evaluators participated to carry out the sensory test as described below. That is, the level of transparency of each transparent orthodontic device was evaluated in a 5-point method by visual observation, and the respective scores were averaged and shown in Table 2 below. Here, the higher the score for each item, the higher the similarity of the corresponding item.

TABLE 2

| | Examples | | | | | | | | |
|---|---|---|---|---|---|---|---|---|---|
| | 2-1 | 2-2 | 2-3 | 2-4 | 2-5 | 2-6 | 2-7 | 2-8 | 2-9 |
| Flexural strength (MPa) | 107.88 | 98.91 | 95.03 | 90.12 | 91.21 | 105.41 | 91.56 | 90.26 | 99.13 |

TABLE 2-continued

| Flexural modulus of elasticity (MPa) | 1948.26 | 1880.34 | 1881.3 | 1801.31 | 1832.45 | 1966.03 | 1983.66 | 1926.24 | 1982.84 |
|---|---|---|---|---|---|---|---|---|---|
| Elongation at break (mm) | 16.79 | 16.98 | 17.62 | 16.12 | 17.46 | 19.41 | 21.13 | 21.93 | 20.55 |
| Transparency | 4.5 | 4.6 | 4.7 | 4.8 | 4.5 | 4.6 | 4.6 | 4.9 | 4.8 |

| | Comparative Example | | | | | | | |
|---|---|---|---|---|---|---|---|---|
| | 2-1 | 2-2 | 2-3 | 2-4 | 2-5 | 2-6 | 2-7 | 2-8 |
| Flexural strength (MPa) | 102.78 | 70.11 | 73.66 | 75.42 | 80.11 | 82.03 | 89.98 | 95.78 |
| Flexural modulus of elasticity (MPa) | 1511.32 | 1370.64 | 1470.3 | 1532.44 | 1512.51 | 1471.90 | 1581.90 | 1474.86 |
| Elongation at break (mm) | 11.98 | 4.96 | 6.42 | 7.72 | 4.01 | 12.24 | 13.56 | 12.16 |
| Transparency | 4.6 | 4.5 | 4.7 | 4.8 | 4.6 | 4.5 | 4.8 | 4.9 |

Referring to Table 2, it can be seen that in terms of flexural strength and elongation at break, the transparent orthodontic devices prepared according to Examples 2-1 to 2-9 exhibited excellent properties compared to the transparent orthodontic devices prepared according to Comparative Examples 2-1 to 2-8.

Referring to Table 2, it can be seen that in terms of flexural strength, flexural modulus of elasticity, and elongation at break, the transparent orthodontic devices prepared according to Examples 2-1 to 2-9 exhibited excellent properties compared to the transparent orthodontic devices prepared according to Comparative Examples 2-2 to 2-7.

However, the transparent orthodontic devices prepared according to Comparative Examples 2-1 and 2-8 exhibited similar flexural strengths to but significantly smaller flexural modulus of elasticity and elongation at break than the transparent orthodontic devices prepared according to Examples 2-1 to 2-9.

In addition, it can be seen that the transparent orthodontic devices prepared according to Examples 2-1 to 2-9 and Comparative Examples 2-1 to 2-8 all showed high transparency.

Although embodiments of the present disclosure have been described with reference to the drawings and the embodiments, these embodiments are an example only, and those skilled in the art would understand that various modifications and other equivalent embodiments can be derived therefrom. Therefore, the scope of the present disclosure should be determined by the appended claims.

The invention claimed is:

1. A composition for forming a transparent orthodontic device, the composition comprising:
   100 parts by weight of a first photocurable compound represented by Formula 1;
   35 to 75 parts by weight of a second photocurable compound represented by Formula 2;
   15 to 65 parts by weight of a third photocurable compound represented by Formula 3;
   5 to 40 parts by weight of a fourth photocurable compound represented by Formula 4;
   1 to 15 parts by weight of a fifth photocurable compound represented by Formula 5, and
   0.5 to 5 parts by weight of an acrylic resin based on a total weight of the first, second, third, fourth, and fifth photocurable compounds being 100 parts by weight:

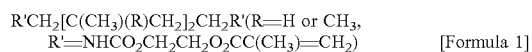

[Formula 1]
R'CH$_2$[C(CH$_3$)(R)CH$_2$]$_2$CH$_2$R' (R=H or CH$_3$, R'=NHCO$_2$CH$_2$CH$_2$O$_2$CC(CH$_3$)=CH$_2$)

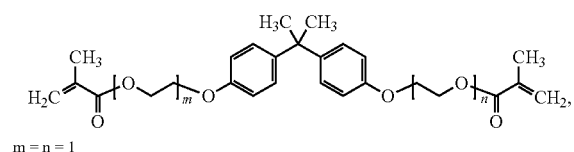

[Formula 2]

m = n = 1

[Formula 3]
CH$_2$=C(CH$_3$)COOCH$_2$CH$_2$OH

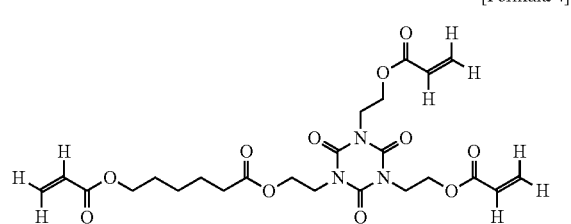

[Formula 4]

[Formula 5]
CH$_2$=C(CH$_3$)COO(CH$_2$CH$_2$O)$_3$COC(CH$_3$)=CH$_2$.

2. A composition for forming a transparent orthodontic device, the composition comprising:
   100 parts by weight of a first photocurable compound represented by Formula 1;
   35 to 75 parts by weight of a second photocurable compound represented by Formula 2;
   15 to 65 parts by weight of a third photocurable compound represented by Formula 3;
   5 to 40 parts by weight of a fourth photocurable compound represented by Formula 4;
   1 to 15 parts by weight of a fifth photocurable compound represented by Formula 5,
   0.5 to 5 parts by weight of an acrylic resin based on a total weight of the first, second, third, fourth, and fifth photocurable compounds being 100 parts by weight; and 1 to 20 parts by weight of a photoinitiator based on the total weight of the first, second, third, fourth, and fifth photocurable compounds:

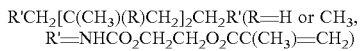  [Formula 1]

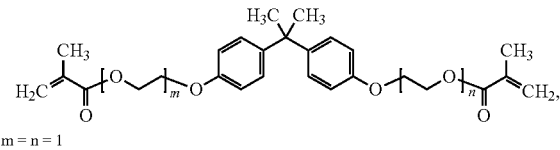  [Formula 2]

  [Formula 3]

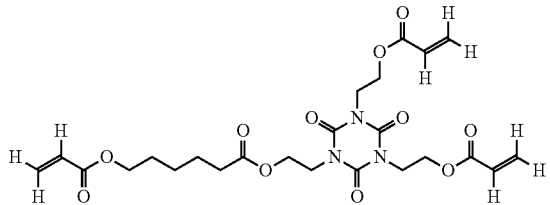  [Formula 4]

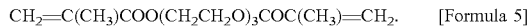  [Formula 5]

3. The composition of claim 1, further comprising an antioxidant in an amount of 0.1 to 2 parts by weight based on the total weight of the first, second, third, fourth, and fifth photocurable compounds.

4. The composition of claim 2, further comprising an antioxidant in an amount of 0.1 to 2 parts by weight based on the total weight of the first, second, third, fourth, and fifth photocurable compounds.

5. The composition of claim 1, wherein the composition is free of a pigment.

6. The composition of claim 1, wherein the composition is free of a solvent.

7. The composition of claim 1, wherein the composition has a viscosity of 300 cps to 800 cps.

8. The composition of claim 1, wherein the composition is liquid, photo-curable, and is used for three-dimensional printing.

9. The composition of claim 2, wherein the composition is free of a pigment.

10. The composition of claim 2, wherein the composition is free of a solvent.

11. The composition of claim 2, wherein the composition has a viscosity of 300 cps to 800 cps.

12. The composition of claim 2, wherein the composition is liquid, photo-curable, and is used for three-dimensional printing.

13. A method of forming a transparent orthodontic device, the method comprising:
preparing the composition of claim 1;
preparing a partially cured transparent orthodontic device by three-dimensional printing the composition; and
preparing a final transparent orthodontic device by fully curing the partially cured transparent orthodontic device.

14. A transparent orthodontic device prepared by the method of claim 13.

15. A method of forming a transparent orthodontic device, the method comprising:
preparing the composition of claim 2;
preparing a partially cured transparent orthodontic device by three-dimensional printing the composition; and
preparing a final transparent orthodontic device by fully curing the partially cured transparent orthodontic device.

16. A transparent orthodontic device prepared by the method of claim 15.

17. A method of forming a transparent orthodontic device, the method comprising:
preparing the composition of claim 3;
preparing a partially cured transparent orthodontic device by three-dimensional printing the composition; and
preparing a final transparent orthodontic device by fully curing the partially cured transparent orthodontic device.

18. A transparent orthodontic device prepared by the method of claim 17.

19. A method of forming a transparent orthodontic device, the method comprising:
preparing the composition of claim 4;
preparing a partially cured transparent orthodontic device by three-dimensional printing the composition; and
preparing a final transparent orthodontic device by fully curing the partially cured transparent orthodontic device.

20. A transparent orthodontic device prepared by the method of claim 19.

* * * * *